(12) United States Patent
Holden et al.

(10) Patent No.: US 7,826,318 B2
(45) Date of Patent: Nov. 2, 2010

(54) METHOD AND SYSTEM FOR ALLOWING A MEDIA PLAYER TO TRANSFER DIGITAL AUDIO TO AN ACCESSORY

(75) Inventors: Paul Holden, Sunnyvale, CA (US); Daniel R. Fletcher, Sunnyvale, CA (US); Barry Twycross, Mountain View, CA (US); John Archibald, San Francisco, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 754 days.

(21) Appl. No.: 11/768,897

(22) Filed: Jun. 26, 2007

(65) Prior Publication Data

US 2008/0025172 A1     Jan. 31, 2008

Related U.S. Application Data

(63) Continuation-in-part of application No. 11/476,312, filed on Jun. 27, 2006.

(51) Int. Cl.
    *G11B 5/09*      (2006.01)
(52) U.S. Cl. ............ 369/47.28; 369/47.3; 369/124.14; 369/59.1
(58) Field of Classification Search ....................... None
See application file for complete search history.

(56) References Cited

U.S. PATENT DOCUMENTS 4,673,861 A    6/1987    Dubovsky et al.
4,850,899 A    7/1989    Maynard (Continued)

FOREIGN PATENT DOCUMENTS

EP      1104150      5/2001

(Continued)

OTHER PUBLICATIONS

"ipodDock/iPod Cradle," www.bookendzdocks.com/bookendz/dock_cradle.htm, downloaded Feb. 27, 2003.

(Continued)

*Primary Examiner*—Muhammad N Edun
(74) *Attorney, Agent, or Firm*—Townsend and Townsend and Crew LLP

(57) ABSTRACT

Digital audio can be transferred between a portable media player and an accessory. In one embodiment, an interface protocol is used to determine the sample rate capabilities of an accessory, allowing digital audio data for a track to be transmitted to the accessory at a sample rate supported by the accessory. When the sample rate of an audio track is not supported by the accessory, the media player can convert the sample rate of the track to a rate supported by the accessory and transmit the track after conversion. The media player also can use the interface protocol to inform the accessory if the sampling rate should be changed, e.g., due to tracks having different sample rates. The accessory then can send a request to the media player to change the sample rate. The media player then can transmit the digital audio data using the new sample rate.

35 Claims, 10 Drawing Sheets

U.S. PATENT DOCUMENTS

| | | |
|---|---|---|
| 4,916,334 A | 4/1990 | Minagawa et al. |
| 4,924,216 A | 5/1990 | Leung |
| 4,938,483 A | 7/1990 | Yavetz |
| 5,041,025 A | 8/1991 | Haitmanek |
| 5,055,069 A | 10/1991 | Townsend et al. |
| 5,080,603 A | 1/1992 | Mouissie |
| 5,104,243 A | 4/1992 | Harding |
| 5,108,313 A | 4/1992 | Adams |
| 5,150,031 A | 9/1992 | James et al. |
| 5,186,646 A | 2/1993 | Pederson |
| 5,247,138 A | 9/1993 | Landmeier |
| 5,277,624 A | 1/1994 | Champion |
| 5,471,128 A | 11/1995 | Patino et al. |
| 5,525,981 A | 6/1996 | Abernethy |
| 5,586,893 A | 12/1996 | Mosquera |
| 5,592,588 A | 1/1997 | Reekes et al. |
| 5,618,045 A | 4/1997 | Kagan et al. |
| 5,648,712 A | 7/1997 | Hahn |
| 5,660,558 A | 8/1997 | Osanai et al. |
| 5,727,866 A | 3/1998 | Kraines et al. |
| 5,732,361 A | 3/1998 | Liu |
| 5,754,027 A | 5/1998 | Oglesbee et al. |
| 5,830,001 A | 11/1998 | Kinoshita |
| 5,835,862 A | 11/1998 | Nykanen et al. |
| 5,845,217 A | 12/1998 | Lindell et al. |
| 5,859,522 A | 1/1999 | Theobald |
| 5,901,049 A | 5/1999 | Schmidt et al. |
| 5,964,847 A | 10/1999 | Booth et al. |
| 5,975,957 A | 11/1999 | Noda et al. |
| 6,007,372 A | 12/1999 | Wood |
| 6,012,105 A | 1/2000 | Rubbmark et al. |
| 6,031,797 A | 2/2000 | Van Ryzin et al. |
| 6,053,773 A | 4/2000 | Wu |
| 6,078,402 A | 6/2000 | Fischer et al. |
| 6,078,789 A | 6/2000 | Bodenmann et al. |
| 6,125,455 A | 9/2000 | Yeo |
| 6,130,518 A | 10/2000 | Gabehart et al. |
| 6,139,373 A | 10/2000 | Ward et al. |
| 6,154,773 A | 11/2000 | Roberts et al. |
| 6,154,798 A | 11/2000 | Lin et al. |
| 6,161,027 A | 12/2000 | Poirel |
| 6,169,387 B1 | 1/2001 | Kaib |
| 6,175,358 B1 | 1/2001 | Scott-Jackson et al. |
| 6,178,514 B1 | 1/2001 | Wood |
| 6,184,652 B1 | 2/2001 | Yang |
| 6,184,655 B1 | 2/2001 | Malackowski |
| 6,188,265 B1 | 2/2001 | Liu et al. |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,230,205 B1 | 5/2001 | Garrity et al. |
| 6,234,827 B1 | 5/2001 | Nishio et al. |
| 6,252,380 B1 | 6/2001 | Koenck |
| 6,261,109 B1 | 7/2001 | Liu et al. |
| 6,267,623 B1 | 7/2001 | Hisamatsu |
| 6,268,845 B1 | 7/2001 | Pariza et al. |
| 6,271,605 B1 | 8/2001 | Carkner et al. |
| 6,272,328 B1 | 8/2001 | Nguyen et al. |
| 6,280,251 B1 | 8/2001 | Nishio et al. |
| 6,283,789 B1 | 9/2001 | Tsai |
| 6,304,764 B1 | 10/2001 | Pan |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,372,974 B1 | 4/2002 | Gross et al. |
| 6,385,596 B1 | 5/2002 | Wiser et al. |
| 6,394,905 B1 | 5/2002 | Takeda et al. |
| 6,429,879 B1 | 8/2002 | Sturgeon et al. |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,505,160 B1 | 1/2003 | Levy et al. |
| 6,524,119 B2 | 2/2003 | Kato et al. |
| 6,526,287 B1 | 2/2003 | Lee |
| 6,558,201 B1 | 5/2003 | Begley et al. |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | DeLeeuw |
| 6,651,138 B2 | 11/2003 | Lai et al. |
| 6,653,813 B2 | 11/2003 | Khatri |
| 6,663,420 B1 | 12/2003 | Xiao |
| 6,665,803 B2 | 12/2003 | Lunsford et al. |
| 6,674,995 B1 | 1/2004 | Meyers et al. |
| 6,687,454 B1 | 2/2004 | Kuroiwa |
| 6,697,944 B1 | 2/2004 | Jones et al. |
| 6,724,339 B2 | 4/2004 | Conway et al. |
| 6,725,061 B1 | 4/2004 | Hutchison et al. |
| 6,728,546 B1 | 4/2004 | Peterson et al. |
| 6,728,729 B1 | 4/2004 | Jawa et al. |
| 6,747,859 B2 | 6/2004 | Walbeck et al. |
| 6,754,468 B1 | 6/2004 | Sieben et al. |
| 6,761,635 B2 | 7/2004 | Hoshino et al. |
| 6,774,939 B1 | 8/2004 | Peng |
| 6,776,626 B2 | 8/2004 | Huang et al. |
| 6,776,660 B1 | 8/2004 | Kubota et al. |
| 6,776,665 B2 | 8/2004 | Huang |
| 6,799,226 B1 | 9/2004 | Robbin et al. |
| 6,801,964 B1 | 10/2004 | Mahdavi |
| 6,813,528 B1 | 11/2004 | Yang |
| 6,816,376 B2 | 11/2004 | Bright et al. |
| 6,830,160 B2 | 12/2004 | Risolia |
| 6,859,538 B1 | 2/2005 | Voltz |
| 6,859,854 B2 | 2/2005 | Kwong |
| 6,879,843 B1 | 4/2005 | Kim |
| 6,928,295 B2 | 8/2005 | Olson et al. |
| 6,931,266 B2 | 8/2005 | Miyoshi et al. |
| 6,931,456 B2 | 8/2005 | Payne et al. |
| 6,939,177 B2 | 9/2005 | Kato et al. |
| 6,991,483 B1 | 1/2006 | Milan et al. |
| 7,004,787 B2 | 2/2006 | Milan |
| 7,013,164 B2 | 3/2006 | Lin |
| 7,050,783 B2 | 5/2006 | Curtiss et al. |
| 7,054,888 B2 | 5/2006 | LaChapelle et al. |
| 7,062,261 B2 | 6/2006 | Goldstein et al. |
| 7,108,560 B1 | 9/2006 | Chou et al. |
| 7,127,678 B2 | 10/2006 | Bhesania et al. |
| 7,127,879 B2 | 10/2006 | Zhu et al. |
| 7,167,112 B2 * | 1/2007 | Andersen et al. .............. 341/61 |
| 7,167,935 B2 | 1/2007 | Hellberg |
| 7,187,947 B1 | 3/2007 | White et al. |
| 7,187,948 B2 | 3/2007 | Alden |
| 7,215,042 B2 | 5/2007 | Yan |
| 7,281,214 B2 | 10/2007 | Fadell |

| | | | | | | |
|---|---|---|---|---|---|---|
| 7,293,122 | B1 | 11/2007 | Schubert et al. | 2004/0186935 A1 | 9/2004 | Bell et al. |
| 7,293,227 | B2 | 11/2007 | Plastina et al. | 2004/0194154 A1 | 9/2004 | Meadors et al. |
| 7,299,304 | B2 | 11/2007 | Saint-Hilaire et al. | 2004/0198436 A1 | 10/2004 | Alden |
| 7,303,282 | B2 | 12/2007 | Dwyer et al. | 2004/0224638 A1 | 11/2004 | Fadell et al. |
| 7,304,685 | B2 | 12/2007 | Park et al. | 2004/0235339 A1 | 11/2004 | Sato et al. |
| 7,305,254 | B2 | 12/2007 | Findikli | 2004/0249994 A1 | 12/2004 | Shapiro et al. |
| 7,305,506 | B1 | 12/2007 | Lydon et al. | 2004/0252966 A1 | 12/2004 | Holloway et al. |
| 7,362,963 | B2 | 4/2008 | Lin | 2004/0267812 A1 | 12/2004 | Harris et al. |
| 7,415,563 | B1 | 8/2008 | Holden et al. | 2004/0267825 A1 | 12/2004 | Novak et al. |
| 7,441,058 | B1 | 10/2008 | Bolton et al. | 2004/0268397 A1* | 12/2004 | Dunbar et al. ................ 725/88 |
| 7,441,062 | B2 | 10/2008 | Novotney et al. | 2005/0014119 A1 | 1/2005 | Rudakov |
| 7,444,388 | B1 | 10/2008 | Svendsen | 2005/0014531 A1 | 1/2005 | Findikli |
| 7,454,019 | B2 | 11/2008 | Williams | 2005/0014536 A1 | 1/2005 | Grady |
| 7,526,588 | B1 | 4/2009 | Schubert et al. | 2005/0015355 A1 | 1/2005 | Heller et al. |
| 7,529,870 | B1 | 5/2009 | Schubert et al. | 2005/0022212 A1 | 1/2005 | Bowen |
| 7,529,871 | B1 | 5/2009 | Schubert et al. | 2005/0047071 A1 | 3/2005 | Tse Chun Hin |
| 7,529,872 | B1 | 5/2009 | Schubert et al. | 2005/0135790 A1 | 6/2005 | Hutten |
| 7,558,894 | B1 | 7/2009 | Lydon et al. | 2005/0149213 A1 | 7/2005 | Guzak et al. |
| 7,587,540 | B2 | 9/2009 | Novotney et al. | 2005/0181756 A1 | 8/2005 | Lin |
| 7,590,783 | B2 | 9/2009 | Lydon et al. | 2005/0207726 A1 | 9/2005 | Chen |
| 7,634,605 | B2 | 12/2009 | Laefer et al. | 2005/0227612 A1 | 10/2005 | Helstrom et al. |
| 7,660,929 | B2 | 2/2010 | Novotney et al. | 2005/0239333 A1 | 10/2005 | Watanabe et al. |
| 2001/0003205 | A1 | 6/2001 | Gilbert | 2005/0240705 A1 | 10/2005 | Novotney et al. |
| 2001/0005641 | A1 | 6/2001 | Matsumoto et al. | 2005/0281185 A1 | 12/2005 | Kawasaki |
| 2001/0006884 | A1 | 7/2001 | Matsumoto | 2006/0015826 A1 | 1/2006 | Shiozawa et al. |
| 2002/0002035 | A1 | 1/2002 | Sim et al. | 2006/0031545 A1 | 2/2006 | Manders et al. |
| 2002/0010759 | A1 | 1/2002 | Hitson et al. | 2006/0056796 A1 | 3/2006 | Nishizawa et al. |
| 2002/0025042 | A1 | 2/2002 | Saito | 2006/0088228 A1 | 4/2006 | Marriott et al. |
| 2002/0029303 | A1 | 3/2002 | Nguyen | 2006/0156415 A1 | 7/2006 | Rubinstein et al. |
| 2002/0065074 | A1 | 5/2002 | Cohn et al. | 2006/0161621 A1 | 7/2006 | Rosenberg |
| 2002/0068610 | A1 | 6/2002 | Anvekar et al. | 2006/0163358 A1 | 7/2006 | Biderman |
| 2002/0072390 | A1 | 6/2002 | Uchiyama | 2006/0184456 A1 | 8/2006 | de Janasz |
| 2002/0103008 | A1 | 8/2002 | Rahn et al. | 2006/0188237 A1 | 8/2006 | Watanabe et al. |
| 2002/0105861 | A1 | 8/2002 | Leapman | 2006/0224620 A1 | 10/2006 | Silverman et al. |
| 2002/0108108 | A1 | 8/2002 | Akaiwa et al. | 2006/0236245 A1 | 10/2006 | Agarwal et al. |
| 2002/0115480 | A1 | 8/2002 | Huang | 2006/0247851 A1 | 11/2006 | Morris |
| 2002/0116533 | A1 | 8/2002 | Holliman et al. | 2006/0258289 A1 | 11/2006 | Dua |
| 2002/0132651 | A1 | 9/2002 | Jinnouchi | 2006/0294209 A1 | 12/2006 | Rosenbloom et al. |
| 2002/0151327 | A1 | 10/2002 | Levitt | 2007/0018947 A1 | 1/2007 | Toro-Lira |
| 2002/0152874 | A1 | 10/2002 | Vilcauskas et al. | 2007/0056012 A1 | 3/2007 | Kwon et al. |
| 2002/0156546 | A1 | 10/2002 | Ramaswamy | 2007/0056013 A1 | 3/2007 | Duncan |
| 2002/0156949 | A1 | 10/2002 | Kubo et al. | 2007/0070856 A1 | 3/2007 | Tebele |
| 2002/0173273 | A1 | 11/2002 | Spurgat et al. | 2007/0080823 A1 | 4/2007 | Fu et al. |
| 2002/0174269 | A1 | 11/2002 | Spurgat et al. | 2007/0083750 A1 | 4/2007 | Miura et al. |
| 2002/0194621 | A1 | 12/2002 | Tran et al. | 2007/0083814 A1 | 4/2007 | Wilbrink et al. |
| 2003/0004934 | A1 | 1/2003 | Qian | 2007/0086724 A1 | 4/2007 | Grady et al. |
| 2003/0011608 | A1 | 1/2003 | Wada | 2007/0106760 A1 | 5/2007 | Houh et al. |
| 2003/0028664 | A1 | 2/2003 | Tan et al. | 2007/0173197 A1 | 7/2007 | Hsiung |
| 2003/0041206 | A1 | 2/2003 | Dickie | 2007/0173294 A1 | 7/2007 | Hsiung |
| 2003/0059022 | A1 | 3/2003 | Nebiker et al. | 2007/0206827 A1 | 9/2007 | Tupman et al. |
| 2003/0067741 | A1 | 4/2003 | Alfonso et al. | 2007/0226384 A1 | 9/2007 | Robbin et al. |
| 2003/0073432 | A1 | 4/2003 | Meade | 2007/0233294 A1 | 10/2007 | Holden et al. |
| 2003/0079038 | A1 | 4/2003 | Robbin et al. | 2007/0233295 A1 | 10/2007 | Laefer et al. |
| 2003/0090998 | A1 | 5/2003 | Lee et al. | 2007/0234420 A1 | 10/2007 | Novotney et al. |
| 2003/0097379 | A1 | 5/2003 | Ireton | 2007/0236482 A1 | 10/2007 | Proctor et al. |
| 2003/0110403 | A1 | 6/2003 | Crutchfield et al. | 2007/0247794 A1 | 10/2007 | Jaffe et al. |
| 2003/0151621 | A1 | 8/2003 | McEvilly et al. | 2009/0013096 A1 | 1/2009 | Novotney et al. |
| 2003/0172209 | A1 | 9/2003 | Liu et al. | 2009/0013110 A1 | 1/2009 | Novotney et al. |
| 2003/0185395 | A1 | 10/2003 | Lee et al. | 2009/0013253 A1 | 1/2009 | Laefer et al. |
| 2003/0198015 | A1 | 10/2003 | Vogt | 2009/0125134 A1 | 5/2009 | Bolton et al. |
| 2003/0220988 | A1 | 11/2003 | Hymel | 2009/0132076 A1 | 5/2009 | Holden et al. |
| 2003/0236075 | A1 | 12/2003 | Johnson et al. | 2009/0198361 A1 | 8/2009 | Schubert et al. |
| 2003/0237043 | A1 | 12/2003 | Novak et al. | 2009/0204244 A1 | 8/2009 | Schubert et al. |
| 2004/0003300 | A1 | 1/2004 | Malueg et al. | 2009/0204738 A1 | 8/2009 | Schubert et al. |
| 2004/0019497 | A1 | 1/2004 | Volk et al. | 2009/0210079 A1 | 8/2009 | Schubert et al. |
| 2004/0039860 | A1 | 2/2004 | Mills et al. | 2009/0249101 A1 | 10/2009 | Lydon et al. |
| 2004/0048569 | A1 | 3/2004 | Kawamura | 2009/0292835 A1 | 11/2009 | Novotney et al. |
| 2004/0090998 | A1 | 5/2004 | Chen | 2009/0299506 A1 | 12/2009 | Lydon et al. |
| 2004/0103223 | A1 | 5/2004 | Gabehart et al. | | | |
| 2004/0116005 | A1 | 6/2004 | Choi | FOREIGN PATENT DOCUMENTS | | |
| 2004/0162029 | A1 | 8/2004 | Grady | | | |
| 2004/0164708 | A1 | 8/2004 | Veselic et al. | EP | 1367734 A1 | 12/2003 |
| 2004/0172533 | A1 | 9/2004 | DeMello et al. | EP | 1498899 A | 1/2005 |

| | | | |
|---|---|---|---|
| EP | 1594319 A | 11/2005 | |
| EP | 1672613 A | 6/2006 | |
| GB | 2405718 A | 3/2005 | |
| JP | 07-176351 | 7/1995 | |
| JP | 10-321302 | 4/1998 | |
| JP | 10-334993 | 12/1998 | |
| JP | 11-288420 | 10/1999 | |
| JP | 2000-214953 | 8/2000 | |
| JP | 2000-223215 | 8/2000 | |
| JP | 2000-223216 | 8/2000 | |
| JP | 2000-223218 | 8/2000 | |
| JP | 2001-035603 | 2/2001 | |
| JP | 2001-069165 A | 3/2001 | |
| JP | 2001-196133 | 7/2001 | |
| JP | 2001-230021 | 8/2001 | |
| JP | 2001-332350 | 11/2001 | |
| JP | 2002-025720 | 1/2002 | |
| JP | 2002-14304 A | 5/2002 | |
| JP | 2002-203641 | 7/2002 | |
| JP | 2002-245719 | 8/2002 | |
| JP | 2002-252566 | 9/2002 | |
| JP | 3090747 U | 10/2002 | |
| JP | 2002-374447 | 12/2002 | |
| JP | 2003-017165 | 1/2003 | |
| JP | 2003-032351 | 1/2003 | |
| JP | 2003-058430 A | 2/2003 | |
| JP | 2003-274386 | 9/2003 | |
| JP | 2002-342659 | 11/2003 | |
| JP | 2004-078538 A | 3/2004 | |
| JP | 2004-259280 A | 9/2004 | |
| WO | WO 99/26330 | 5/1999 | |
| WO | WO 00/39907 | 7/2000 | |
| WO | WO 00/60450 | 10/2000 | |
| WO | WO 02/49314 | 6/2002 | |
| WO | WO 03/036541 A1 | 5/2003 | |
| WO | WO 03/036957 A1 | 5/2003 | |
| WO | WO 03/073688 | 9/2003 | |
| WO | WO 2004/084413 | 9/2004 | |
| WO | WO 2004-095772 A1 | 11/2004 | |
| WO | WO 2004/112311 A | 12/2004 | |
| WO | WO 2005/119463 A | 12/2005 | |
| WO | WO 2006/080957 A1 | 8/2006 | |

OTHER PUBLICATIONS

"Making USB Work", downloaded Oct. 16, 2001, PC Magazine: PC Tech wysiwyg:/ 15 5/http://www.zdnet.com/pcmag/pctech/content!18/04/tu_1804.001.html.

"Neuros MP3 Digital Audio Computer," www.neurosaudio.com, downloaded Apr. 9, 2003.

U.S. Appl. No. 12/610,966, filed Nov. 2, 2009, Laefer et al.

Anonymous: "Future of Digital Music in Windows," Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous: "Introduction to Digital Audio," Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous; "Windows and Red Book Audio," Microsoft Windows Hardware Developer Central Archive, [Online] Dec. 4, 2001 URL:http://www.microsoft.com/whdc/archive/Dmfuture.mspx> [retrieved Jan. 15, 2008].

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html.

Belkin iPod Voice Recorder, Product Specification Sheet, printed Jun. 16, 2004.

Bindra, "Standard Turns Monitor into I/O Hub," Electronic Engineering Times, vol. 918, Sep. 6, 1996, p. 14.

Brentrup, "Introduction to Public Key Cryptography Demystified," Campus Technology, printed from http://www.campus-technology.com/article.asp?id=7626 on Oct. 6, 2004.

"Cables to Go," download Oct. 16, 2001 http://www.cablestogo.com/product.asp?cat%5Fid=601&sku=27028.

Crawford et al., "Sample rate conversion and bit rate reduction in the studio," IEE Colloquim on Digital Audio Signal Processing, May 22, 1991, pp. 8/1-8/3.

"FireWire," downloaded Oct. 16, 2001, si wyg:/ /4 2/http://developer.apple. com|hardware|Fire Wire.

"Fire Wire Connector", downloaded Oct. 16, 2001, wysiwyg:/176/ http://developer.apple.com/...es/Macintosh CPUsG3/ibook/ibook-27.html.

Fried, "FireWire poised to become ubiquitous," downloaded Oct. 16, 2001, CNET News.com, 1394 Trade Association: Press, wysiwyg:/ 132/http:/ 113 94ta.org/Press/200 1 Press/auqust!8.2 7. b.html.

Fried, "New Fire Wire to blaze faster trail", downloaded Oct. 16, 2001, CNET News.com, http://news.cnet.com/news/0/I006-200-6021210.html.

"How to Connect Your Computer PC Hardware," downloaded Oct. 16, 2001, http:///www.scar.utoronto.ca!~ccweb/faculty/connect-howto.html.

"IEEE 1394/USB Comparison," downloaded Oct. 16,2001, www.genitech.com.aulLIBRARY/TechSupportiinfobits/firewirevsusb.htm.

"Introduction to Public Key Cryptography," Oct. 9, 1998, printed from http://developer.netscape.com/docs/manuals/security/pkin/contents.html on Oct. 6, 2004.

iPod Classic User's Guide, acquired from apple.com, 2002; 44 pages.

iPod nano Features Guide, acquired from apple.com, 2008; 72 pages.

iPod touch User's Guide, acquired from apple.com, 2008, 120 pages.

Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10.

Lewis, "On Technology" Fortune Magazine, Dec. 9, 2002.

Microsoft, "Media Transport Protocol Implementation Details," 2005, 18 pages.

"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document.

"PMC FW2 IEEE1394 FireWire Controller," downloaded Oct. 16, 2001, http://www.bvmltd.co.uk/PMCfw2ds.html.

Severance, "FireWire Finally Comes Home", Michigan State University, Standards, Nov. 1998, pp. 117-118.

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

Teener, "Understanding Fire Wire: The IEEE 1394 Standards and Specifications", downloaded Oct. 16, 2001, wysiwyg:119/http:1 |www.chipcenter.com/networking/ieee 1394/main.html.

"Universal Serial Bus Specification—Rev 2.0," Chapter 6, Compaq Hewlett-Packard, Apr. 27, 2000, pp. 85, 99-100.

Vitaliano, "Why FireWire is Hot!Hot!Hot!" downloaded Oct. 16, 2001, "Impact.FireWire.SideBar" http://www.vxm.com/21R.35.html.

Whittle, "Public Key Authentication Framework: Tutorial," First Principles Consulting, Jun. 2, 1996.

MAXTech Technology Ltd., CES 2000/Las Vegas, Jan. 6-9, 2000, [on line], [retrieved on Sep. 26, 2008]. Retrieved from the Internet <URL: http://web.archive.org/web/2000930170634/www.maxtech.com.hk/t-details.htm>. 2 pages.

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

Derman, "Monitors Make Net Connections," Electronic Engineering Times, vol. 933, Dec. 23, 1996, pp. 60 and 69.

Menezes et al., "Handbook of Applied Cryptography," *Identification and Entity Authentication*, Dec. 16, 1996, pp. 385-424.

Networking Tech Note, "1394 Standards and Specifications,", 2001, 3 pages.

"The Authoritive Dictionary of IEEE Standards Terms, Seventh Edition," Published by Standards Information Network, IEEE Press, Dec. 1, 2000, pp. 1215.

"Universal Serial Bus Specification - Rev. 2.0," XP002474828, *Chapter 9: USB Device Framework*, Apr. 27, 2000, pp. 239-274.

Altec Lansing, "inMOTION Users Guide," Corp. Headquarters, 2003, 7 pages.

* cited by examiner

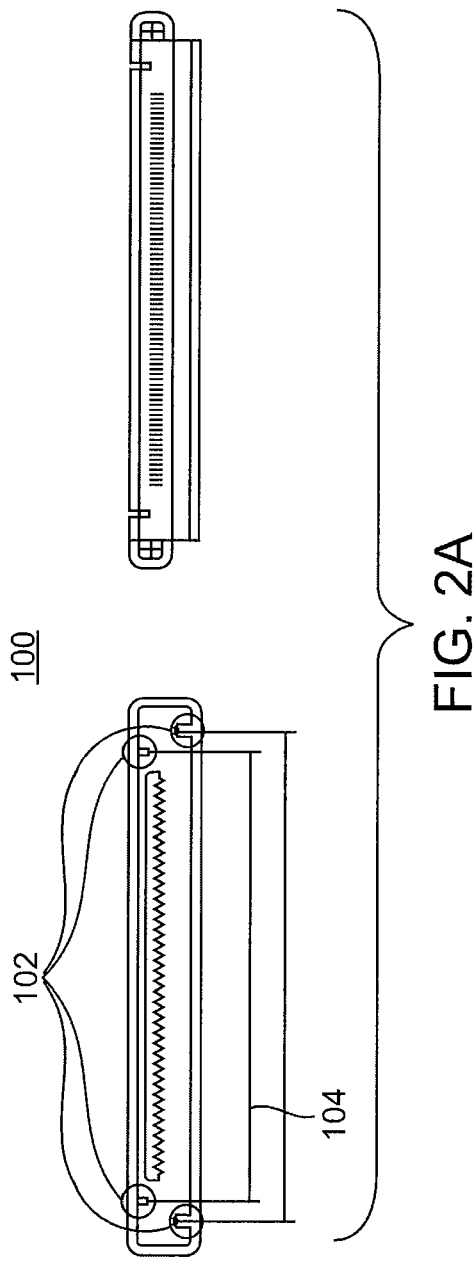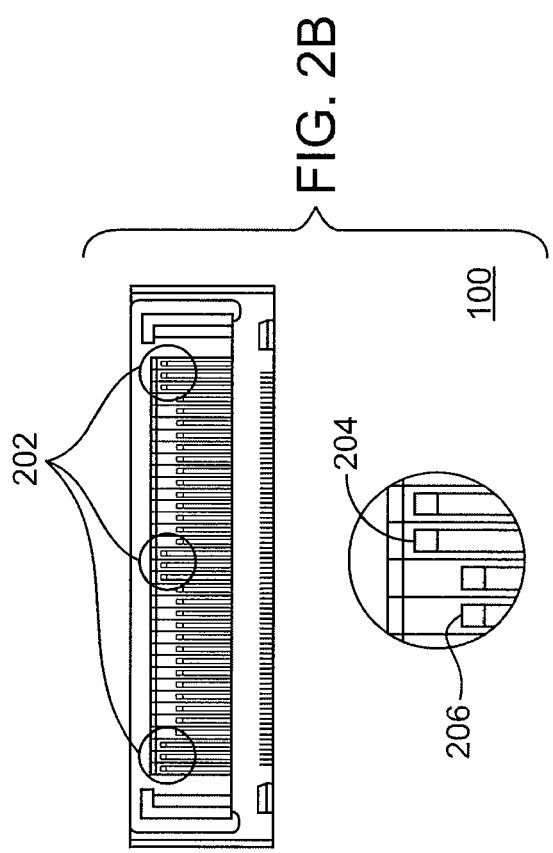

| Pin | Signal Name | I/O | Function |
|---|---|---|---|
| 1 | DGND | GND | Digital Ground |
| 2 | DGND | GND | Digital Ground |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB PWR | I | USB power in; used to detect USB hub |
| 9 | TPB- | I/O | FireWire signal |
| 10 | Accessory Identify | I | Connection for accessory identification resistor |
| 11 | F/W PWR+ | I | Firewire and charger input power (8V to 15V dc) |
| 12 | F/W PWR+ | I | Firewire and charger input power (8V to 15V dc) |
| 13 | Accessory Pwr | O | Nominal 3.3V output; current limited to 100 mA |
| 14 | Reserved | | |
| 15 | DGND | GND | Digital Ground |
| 16 | DGND | GND | Digital Ground |
| 17 | Reserved | | |
| 18 | Rx | I | Serial protocol input to media player |
| 19 | Tx | O | Serial protocol output from media player |
| 20 | Accessory Detect | I | Connection for accessory identification resistor |
| 21 | S Video Y | O | Luminance component for S-video |
| 22 | S Video C | O | Chrominance component for S-video |
| 23 | Composite Video | O | Composite video signal |
| 24 | Remote sense | I | Detect remote |
| 25 | LINE-IN L | I | Line level input for left audio channel |
| 26 | LINE-IN R | I | Line level input for right audio channel |
| 27 | LINE-OUT L | O | Line level output to left audio channel |
| 28 | LINE-OUT R | O | Line level output to right audio channel |
| 29 | Audio Return | --- | Signal, not to be grounded in accessory |
| 30 | DGND | GND | Digital ground |
| 31 | Chassis | | Chassis ground for connector shell |
| 32 | Chassis | | Chassis ground for connector shell |

FIG. 4A

| Pin | Signal Name | I/O | Function |
|---|---|---|---|
| 1 | Audio. Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 4B

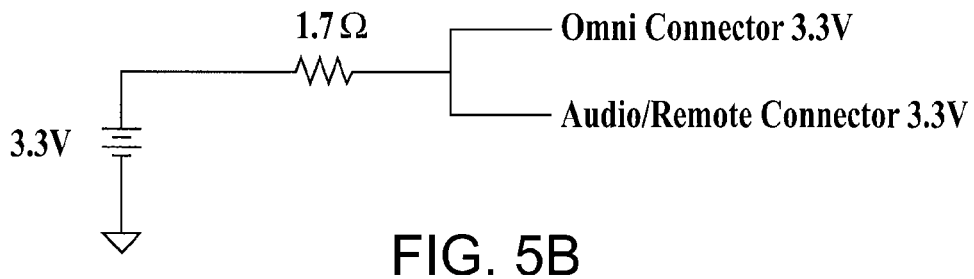

FIG. 5B

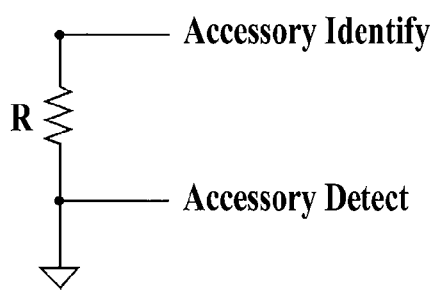

FIG. 5C

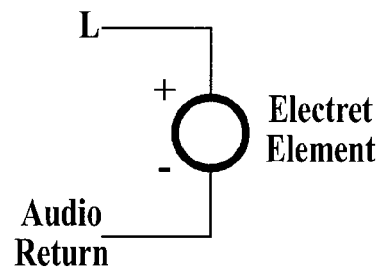

FIG. 5D

| Decimal Sample Rate (Hz) | Hex Sample Rate (Hz) |
|---|---|
| 8,000 | 0x00001F40 |
| 11,025 | 0x00002B11 |
| 12,000 | 0x00002EE0 |
| 16,000 | 0x00003E80 |
| 22,050 | 0x00005622 |
| 24,000 | 0x00005DC0 |
| 32,000* | 0x00007D00* |
| 44,100* | 0x0000AC44* |
| 48,000* | 0x0000BB80* |

FIG. 8

METHOD AND SYSTEM FOR ALLOWING A MEDIA PLAYER TO TRANSFER DIGITAL AUDIO TO AN ACCESSORY

CROSS-REFERENCES TO RELATED APPLICATIONS

This application is a Continuation-In-Part of co-pending U.S. patent application Ser. No. 11/476,312, entitled "Method and System for Allowing a Media Player to Transfer Digital Audio to an Accessory," filed on Jun. 27, 2006, which is assigned to the assignee of the present application and which is incorporated herein by reference in its entirety for all purposes.

FIELD OF THE INVENTION

The present invention relates generally to electrical devices and more particularly to electrical devices such as portable media players that communicate with accessory devices.

BACKGROUND OF THE INVENTION

A portable media player stores media assets, such as audio tracks, video tracks or photos that can be played or displayed on the portable media player. One example of a portable media player is the iPod™ portable media player, which is available from Apple Inc. of Cupertino, Calif. Often, a portable media player acquires its media assets from a host computer that serves to enable a user to manage media assets. As an example, the host computer can execute a media management application to manage media assets. One example of a media management application is iTunes®, produced by Apple Inc.

A portable media player typically includes one or more connectors or ports that can be used to interface with other devices. For example, the connector or port can enable the portable media player to couple to a host computer, be inserted into a docking system, or receive an accessory device. In the case of the iPod™, for example, a vast array of accessory devices have been developed that can interconnect to the portable media player. For example, a remote control can be connected to the connector or port to allow the user to remotely control the portable media player. As another example, an automobile can include a connector and the portable media player can be inserted onto the connector such that an automobile media system can interact with the portable media player, thereby allowing the media content on the portable media player to be played within the automobile. In another example, a digital camera can be connected to the portable media player to download images and the like.

Portable media players commonly store audio signals in digital form. The audio signal, however, is typically converted into analog form before being transmitted to an accessory such as a speaker system. Because digital audio offers a number of advantages, such as wider dynamic range and increased resistance to noise, more and more electronic devices and accessories are being developed that are capable of receiving digital audio. It is therefore desirable to enable portable media players to transfer digital audio to an accessory.

BRIEF SUMMARY OF THE INVENTION

The present invention provides various embodiments for enabling transfer of digital audio between a portable media player and an accessory. In one embodiment, the invention utilizes an interface protocol to determine the sample rate capabilities of an accessory and transmits digital audio to the accessory at a sample rate that is supported by the accessory. An accessory may support multiple sample rates. When an audio track has a sample rate that is not supported by the accessory, the media player can convert the sample rate of the media track to one that is supported by the accessory before transmission to the accessory. In some instances, the sample rate of a particular audio track may require a change from one supported sample rate to another for transmission. Using the interface protocol, the media player can inform the accessory of the need to change sample rate to another supported sample rate. The accessory then can send a request to the media player asking that the new track be transmitted at the new sample rate. The media player then can transmit the audio track using the new sample rate, internally converting the sample rate of the particular audio track if necessary.

One aspect of the present invention relates to a method for transmitting digital audio data to an accessory by a media player. The media player can obtain from the accessory, using an accessory protocol, a list of sample rates for digital audio supported by the accessory. The media player can identify a stored sample rate for a first track of digital audio data to be played, where the first track is stored on the media player. The media player can select a first playback sample rate for the first track; the first playback sample rate can be based on the list of sample rates supported by the accessory and the stored sample rate for the first track. The media player can transmit to the accessory, using the accessory protocol, information indicating the first playback sample rate and can then deliver the digital audio data of the first track to the accessory at the first playback sample rate.

Another aspect of the present invention relates to a method for obtaining digital audio from a media player by an accessory. The accessory can provide to the media player, using an accessory protocol, a list of sample rates supported by the accessory. The accessory can receive from the media player, using the accessory protocol, an identification of a first playback sample rate associated with a first track of digital audio data to be played, the first track being a track stored on the media player. The first playback sample rate which is selected by the media player, is one of the sample rates included in the list of sample rates supported by the accessory. The accessory can configure a digital audio transfer interface of the accessory and the media player to receive data at the first playback sample rate and can then receive from the media player, using the digital audio transfer interface, the digital audio data of the first track at the first playback sample rate.

Another aspect of the present invention relates to a media player. The media player can include an interface configured to communicate with an accessory, a storage device, and a processor coupled to the storage device and the interface. The interface can be configured to support a digital audio transfer protocol for transferring digital audio to the accessory and can be further configured to support an accessory protocol for exchanging with the accessory commands and information related to the delivery of digital audio data. The storage device can be configured to store media assets including a plurality of tracks of digital audio data; each track can have a stored sample rate that is either stored with the digital audio data or otherwise associated therewith. The processor can be configured to obtain from the accessory, using the accessory protocol of the interface, a list of sample rates supported by the accessory; to select a first sample rate for a first stored track of digital audio data based on the stored sample rate associated with the first stored track and the list of sample rates supported by the accessory; to communicate to the accessory, using the accessory protocol, the selected sample rate; and to deliver to the accessory, using the digital audio transfer protocol, the digital audio data of the first stored track at the first selected sample rate.

Another aspect of the present invention relates to an accessory for use with a media player. The accessory can include an interface configured to communicate with the media player, an audio output section, and a controller coupled between the interface and the audio output section. The interface can be configured to support a digital audio transfer protocol for receiving digital audio from the media player and can be further configured to support an accessory protocol for exchanging with the media player commands and information related to the delivery of digital audio data. The audio output section can be configured to convert digital audio data to analog audio signals. The controller can be configured to provide to the media player, using the accessory protocol, a list of sample rates supported by the accessory; to receive from the media player, using the accessory protocol, information identifying a first playback sample rate associated with a first track of digital audio data to be played, the first track being a track stored on the media player, wherein the first playback sample rate is selected by the media player and is one of the sample rates included in the list of sample rates supported by the accessory; to operate the interface, using the digital audio transfer protocol, to receive data at the first playback sample rate; and to deliver the digital audio data to the output section.

In some embodiments, the accessory can use the information indicating the first playback sample rate to configure the interface protocol via which the digital audio data is to be delivered. The playback sample rate can be changed between tracks. For example, the media player can send new sample rate information for each track, and the accessory can respond to the new sample rate information by changing a sample rate used in the digital audio transfer protocol.

A better understanding of the nature and advantages of the present invention can be gained by reference to the detailed description below and the accompanying drawings.

BRIEF DESCRIPTION OF THE DRAWINGS

FIGS. 2A and 2B illustrate a docking connector that can be used an embodiment of the present invention.

FIG. 4A illustrates connector pin designations for a docking connector that can be used in an embodiment of the present invention.

FIG. 4B illustrates connection pin designations for a remote connector that can be used in an embodiment of the present invention.

FIG. 5B illustrates a reference schematic diagram for an accessory power source that can be used in an embodiment of the present invention.

FIG. 5C illustrates a reference schematic diagram for a system for detecting and identifying accessories for the docking connector that can be used in an embodiment of the present invention.

FIG. 5D is a reference schematic of an electret microphone that may be within the remote connector of FIG. 3A.

FIG. 8 illustrates sample rates that can be supported by a media player according to an embodiment of the present invention.

DETAILED DESCRIPTION OF THE INVENTION

The present invention relates generally to electrical devices and more particularly to electrical devices such as portable media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a system and method in accordance with an embodiment of the present invention, a plurality of commands allow a media player to transfer digital audio to an accessory. The method and system can include sending a play command to the media player; negotiating a sample rate supported by both the media player and the accessory; and providing digital audio to the accessory at the negotiated sample rate. The media player may perform sample rate conversion internally to transfer digital audio at the negotiated sample rate. The plurality of commands can be utilized in a variety of environments. One such environment is within a connector interface system environment such as described in detail hereinbelow.

Figure 1:
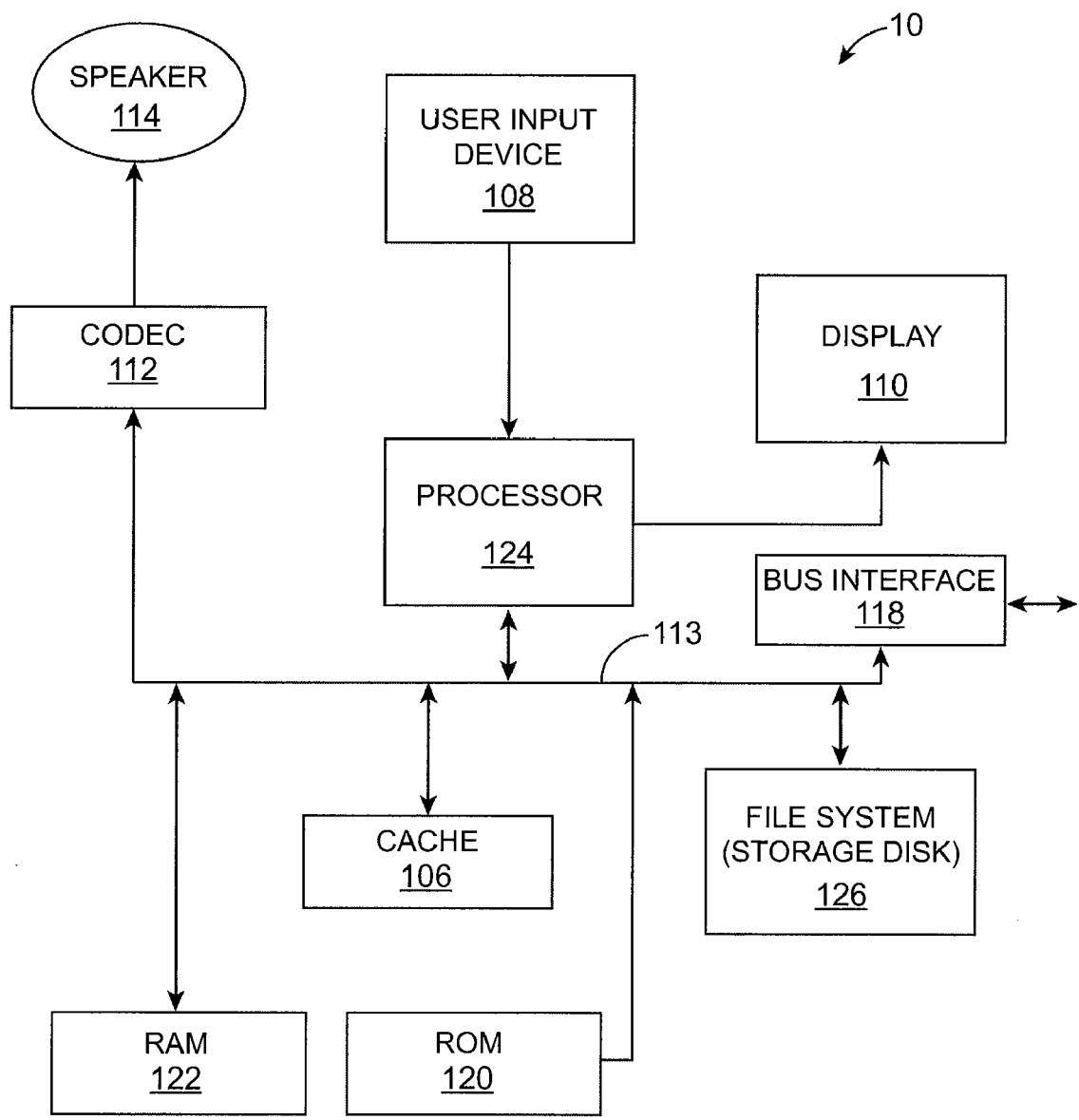
FIG. 1 shows a portable media player that can be coupled to an accessory to transfer digital audio according to an embodiment of the present invention.

FIG. 1 shows a simplified block diagram for exemplary portable media player 10 in accordance with an embodiment of the invention. Portable media player 10 can include processor 124 such as a microprocessor or controller operable to control the overall operation of portable media player 10. Portable media player 10 can store media data pertaining to media assets in file system 126 and/or cache 106. File system 126 (e.g., a disk drive or flash memory or the like) may provide high capacity storage capability for portable media player 10. File system 126 can be used to store media assets such as audio tracks. Each stored audio track includes digital audio data and may also include other information such as a sample rate for the digital audio data.

To improve access time to file system 126, portable media player 10 can also include cache 106. Cache 106 may be, for example, random-access memory (RAM). The relative access time to cache 106 can be substantially shorter than for file system 126, but cache 106 might have a smaller storage capacity than file system 126. Further, file system 126, when active, may consume more power than does cache 106. Power consumption is particularly important when portable media player 10 is powered by a battery (not shown). Portable media player 10 can also includes additional RAM 122 and read-only memory (ROM) 120. ROM 120 can store programs to be executed by processor 124. RAM 122 provides volatile data storage, such as for cache 106, for media data that is buffered during playback, or for other purposes that can be facilitated by temporary data storage.

Portable media player 10 can also include user input device 108, which can allow a user of portable media player 10 to interact with portable media player 10. For example, user input device 108 can take a variety of forms, such as a button, keypad, touch screen, dial, etc. Still further, portable media player 10 can also include display 110 (e.g., LCD or other display screen) that can be controlled by processor 124 to display information as well as photos and video tracks to the user. Data bus 113 can facilitate data transfer between at least file system 126, cache 106, processor 124, and other functional blocks. Portable media player 10 can also include bus interface 116, which can couple to data link 118. Data link 118 in some embodiments allows portable media player 10 to couple to a host computer (not shown), which can be a stand alone host computer or part of an interconnected network of computers, such as the Internet or other such distributed systems. Data link 118 in some embodiments can also allow portable media player 10 to couple to any of a wide range of accessories, including accessories capable of converting a received stream of digital audio samples to analog audio output signals (e.g., signals suitable for driving conventional speaker and/or headphone systems).

In one embodiment, portable media player 10 can store a plurality of media assets (e.g., songs, videos, photos) in file system 126. When a user desires to have portable media player 10 play a particular media item, a list of available media assets is displayed on display 110. Then, using user input device 108, the user can select one of the available media assets. Processor 124, upon receiving a selection of a particular media item, such as an audio file, can supply the media data for the particular media item to coder/decoder (CODEC) 112 via bus 113. CODEC 112 can produce analog output signals for speaker 114. Speaker 114 can be a speaker internal to portable media player 10 or external to portable media player 10. For example, headphones or earphones that connect to the portable media player 10 can be considered an external speaker. In other applications, media asset files stored on the host computer or in other computers coupled to the host computer by way of the network can be transferred (otherwise referred to as downloaded) to file system 126 (or cache 106). These media assets can also be, for example, videos or photos which can be provided to display 110 via a video processor (not shown) either coupled to or within processor 124. In this way, media player 10 can make any number and type of media asset files available for playing.

For example, in a particular embodiment, the available media assets are arranged in a hierarchical manner based upon a selected number and type of groupings appropriate to the available media assets. In the case where portable media player 10 is an MP3 type (or other audio) media player, the available media assets can take the form of MP3 (or other audio) files, each of which can correspond to a digitally encoded song or other digital audio data stored at least in part in file system 126. The available media assets (e.g., songs) can be grouped in any manner deemed appropriate. In one arrangement, songs can be arranged hierarchically as a list of music genres at a first level, a list of artists associated with each genre at a second level, a list of albums for each artist listed in the second level at a third level, while at a fourth level a list of songs for each album listed in the third level, and so on. Other arrangements and/or groupings can also be used.

A method and system in accordance with the present invention can be utilized with a portable media player and its associated accessory in a variety of environments. One such environment is within a connector interface system that is described in detail hereinbelow. The connector interface system allows for the portable media player and the accessory to communicate utilizing interface signals over at least one of the pins of the connector interface system.

Connector Interface System Overview

To describe the features of the connector interface system in accordance with the present invention in more detail, refer now to the following description in conjunction with the accompanying drawings. The connectors described herein are illustrative and may be modified. In addition, while two connectors for a media player are described, the present invention can be practiced in connection with any media player that has at least one connector capable of streaming out digital audio data.

Docking Connector

FIGS. 2A and 2B illustrate docking connector 100 in accordance with the present invention. Referring first to FIG. 2A, keying features 102 can be of custom length 104. In addition, a specific key arrangement where one set of keys separated by one length are at the bottom and another set of keys separated by another length are at the top of the connector can be used. The use of a specific key arrangement prevents noncompliant connectors from being plugged in and causing potential damage to the device. The connector for power can use a USB or Firewire specification for power. The connector can include a first make/last break contact consistent with USB or Firewire specifications. FIG. 2B illustrates first make/last break contact 202 and also illustrates ground pin 204 and power pin 206 related to providing an appropriate first make/last break contact. In this example, ground pin 204 is longer than power pin 206. Therefore, ground pin 204 would contact its mating pin in the docking accessory before power pin 206 contacts its mating pin, minimizing the risk of internal electrical damage to the electronics of the device. Further details of an exemplary embodiment for docking connector 100 are described in U.S. Pat. No. 6,776,660 entitled CONNECTOR, which issued on Aug. 17, 2004 and is incorporated herein by reference in it entirety.

In addition, a connector interface system in accordance with the present invention can use both USB (Universal Serial Bus) and Firewire interfaces as part of the same docking connector alignment, thereby making the design more compatible with different types of interfaces, as discussed in detail hereinafter. In so doing, more remote accessories can interface with the portable media player.

Remote Connector

Figure 3A:
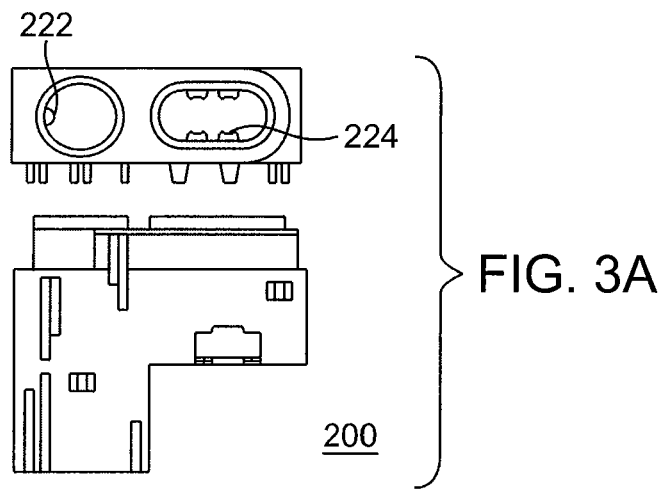
FIG. 3A is a front and top view of a remote connector that can be used with an embodiment of the present invention.
Figure 3B:
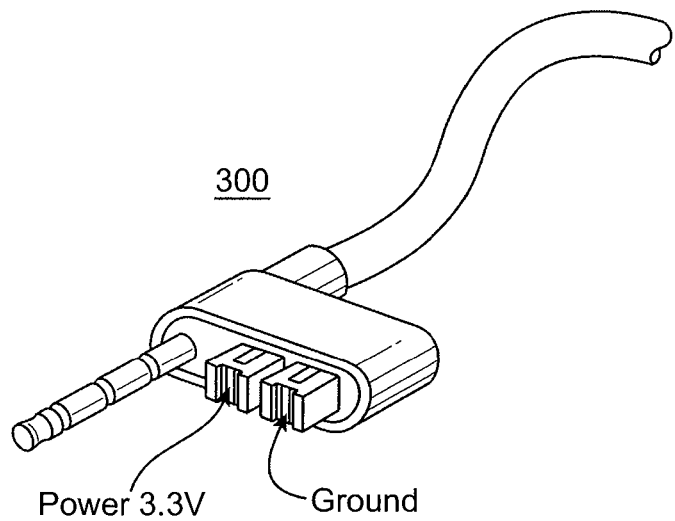
FIG. 3B illustrates a plug to be utilized in the remote connector of FIG. 3A.
Figure 3C:
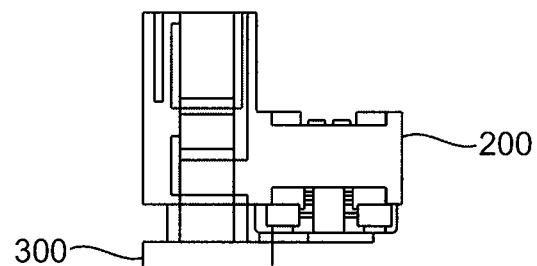
FIG. 3C illustrates the plug of FIG. 3B inserted into the remote connector of FIG. 3A.

The connector interface system can also include a remote connector which provides analog audio input and/or output, an I/O serial protocol, and video input and/or output. FIG. 3A is a front and top view of remote connector 200 that can be used in an embodiment of the present invention. As is seen, remote connector 200 includes top headphone receptacle 222, as well as second receptacle 224 for remote devices. FIG. 3B illustrates plug 300 that can be utilized in remote connector 200. Plug 300 allows these features to be provided via the remote connector. FIG. 3C illustrates plug 300 inserted into remote connector 200. A standard headphone cable can be plugged in, but special remote control cables, microphone cables and video cables can also be utilized with the remote connector.

To describe the features of the connector interface system in more detail, provided below is a functional description of the docking connector, remote connector and a command set in accordance with embodiments of the present invention.

Docking and Remote Connector Specifications

For an example of the connector pin designations for both the docking connector and for the remote connector for a portable media player such as an iPod™ device by Apple Computer, Inc., refer now to FIGS. 4A and 4B. FIG. 4A illustrates connector pin designations that can be used for the docking connector. FIG. 4B illustrates connection pin designations that can be used for the remote connector.

Docking Connector Specifications

FIG. 4A illustrates a Firewire connector interface that can be used in the docking connector:

Firewire Power:
a) 8V-30V DC IN
b) 10 W Max
Firewire Signal:
a) Designed to IEEE 1394 A Spec (400 Mb/s)

USB Interface

In one embodiment, the portable media player can provide two configurations, or modes, of USB device operation. In one configuration, the media player supports the USB mass storage class, allowing it to be used as a USB mass storage device. In the other configuration (referred to herein as an "HID/audio" configuration), the media player supports both the human interface device (HID) and audio classes. Thus, the media player in HID/audio configuration can exchange packets containing commands and associated data with an accessory. The commands and data can conform to an accessory protocol as described below; the term "accessory protocol" refers generally to the software component of the media player that communicates with accessories over a given transport layer (in this example, the USB HID class defines the transport layer). In the HID/audio configuration, the media player can also stream digital audio to an accessory, with the digital audio stream conforming to the USB audio specifications.

Accessory Power

Figure 5A:
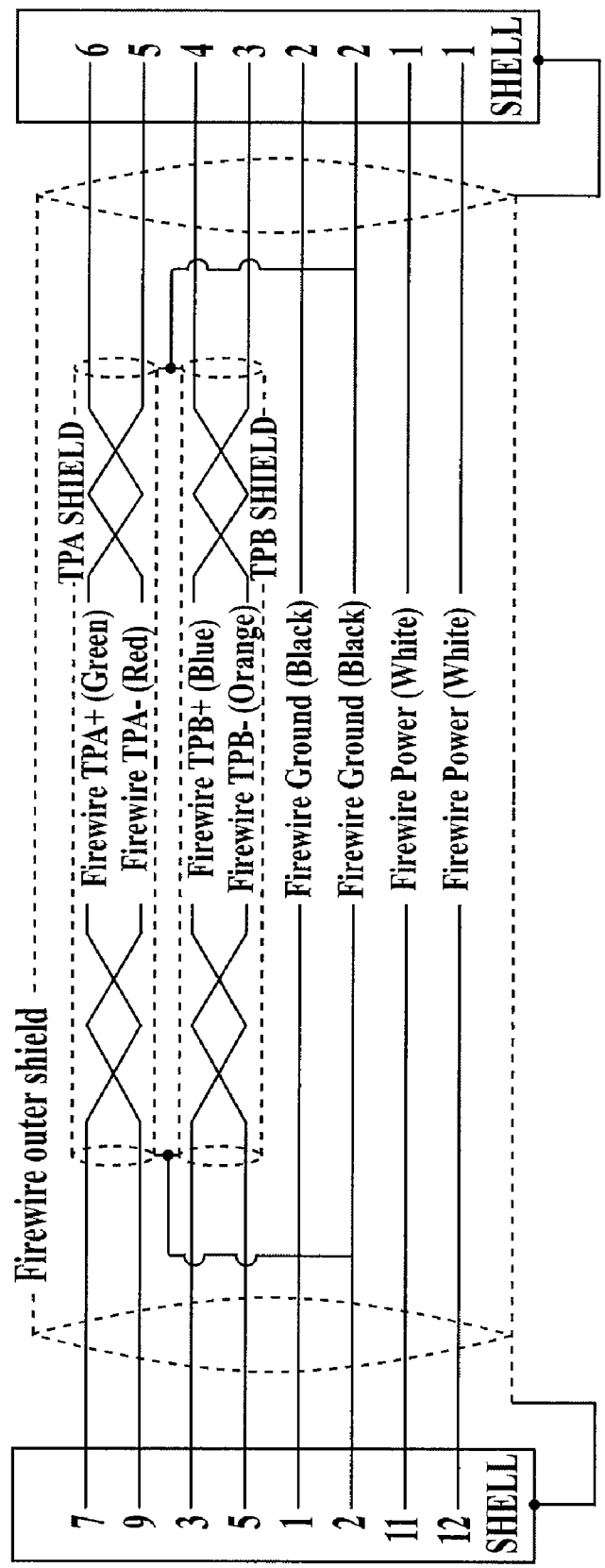
FIG. 5A illustrates a FireWire connector interface for a docking connector that can be used in an embodiment of the present invention.

FIG. 5B illustrates an accessory power source that can be included in a connector interface. The portable media player accessory power pin can supply voltages, for example, 3.0 V to 3.3V+/−5% (2.85 V to 3.465 V) over the docking connector and remote connector (if present), thus providing operating voltages to an accessory coupled to the media player. A maximum current can be shared between the docking connector and the remote connector.

By default, the portable media player can supply a particular current such as 5 mA. An appropriate software accessory detection system can be employed to turn on high power (for example, up to 100 mA) during active device usage. When devices are inactive, they typically consume less than a predetermined amount of power such as 5 mA current.

Accessory power can be switched off for a period of, for example, approximately 2 seconds during the powering up of the portable media player. This can be done to ensure that accessories are in a known state and can be properly detected by the media player. In one embodiment, accessories are responsible for re-identifying themselves after the portable media player transitions accessory power from the off to the on state.

Accessory power can be grounded through the Digital Ground (DGND) pins.

FIG. 5C illustrates a reference schematic diagram for a system for detecting and identifying accessories that can be implemented, e.g., in the docking connector. The system comprises:

a) A resistor (R) to ground that allows the device to determine what type of accessory has been plugged into the docking connector; and
b) Two identify and detect pins (Accessory Identify (pin 10, FIG. 4A) and Accessory Detect (pin 20, FIG. 4A)).

FIG. 5D is a reference schematic of an electret microphone that can be implemented, e.g., within the remote connector.

Serial Protocol Communication can also be implemented, e.g., in the docking connector. Thus, there can be provided:

a) Two pins used to communicate to and from device: Rx (pin 19, FIG. 4A) & Tx (pin 18, FIG. 4A).
b) Input & Output reference levels (e.g., 0V=Low, 3.3V=High).

Stereo Accessory

Figure 6A:
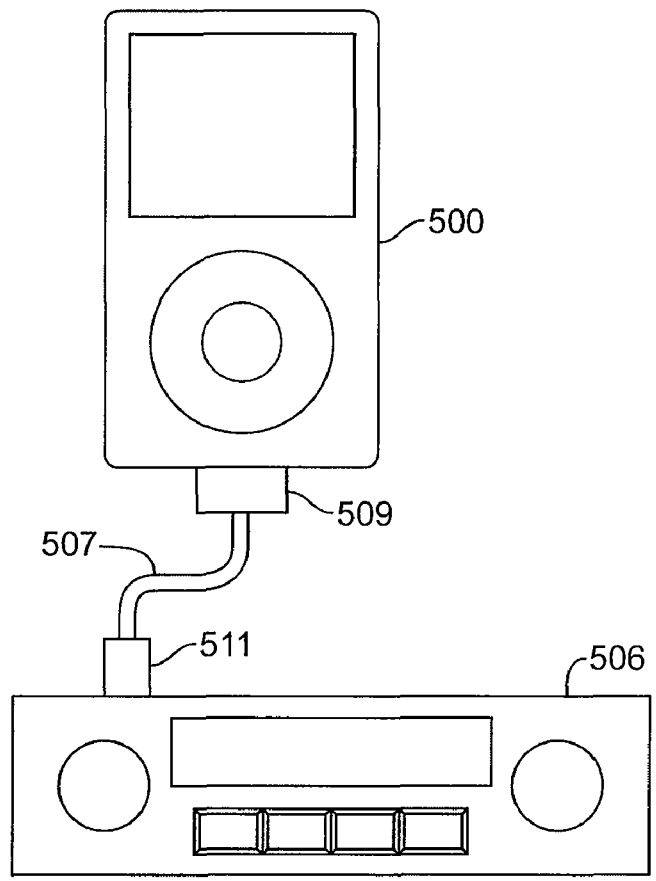
FIG. 6A illustrates a portable media player coupled to a stereo accessory for transfer of digital audio according to an embodiment of the present invention.

As mentioned previously, portable media players connect to a variety of accessories. What is meant by accessories includes but is not limited to docking stations, chargers, car stereos, microphones, home stereos, computers, speakers, and accessories which communicate wirelessly with other accessories. For instance, FIG. 6A illustrates media player 500 (which can be an embodiment of media player 10 described above) coupled to stereo accessory 506 according to an embodiment of the present invention. Stereo accessory 506 can be, e.g., a home stereo, car stereo, or any other accessory with the capability of receiving streamed digital audio data from media player 500. For instance, stereo accessory 506 can include a USB interface port capable of using the HID/audio configuration of media player 500 to receive a digital audio stream, and media player 500 can be configured to deliver a digital audio stream, e.g., using the USB pins identified above with reference to FIG. 4A. Stereo accessory 506 can include components capable of converting the received digital audio stream to analog audio signals (e.g., signals usable to drive conventional speakers or headphones).

In the embodiment shown in FIG. 6A, cable 507 connects accessory 506 and media player 500. Cable 507 can be an adaptor cable that has at one end connector 509, which is adapted to mate with a docking connector (e.g., as shown in FIG. 2A) of media player 500, and at the other end connector 511, which is adapted to mate with a connector (e.g., a standard USB port) of accessory 506. Other connections can also be used. For example, stereo accessory 506 can include a bay or receptacle (not shown) adapted to receive and hold media player 500, and the bay or receptacle can be configured with a connector that mates directly with the docking connector of media player 500.

Figure 6B:
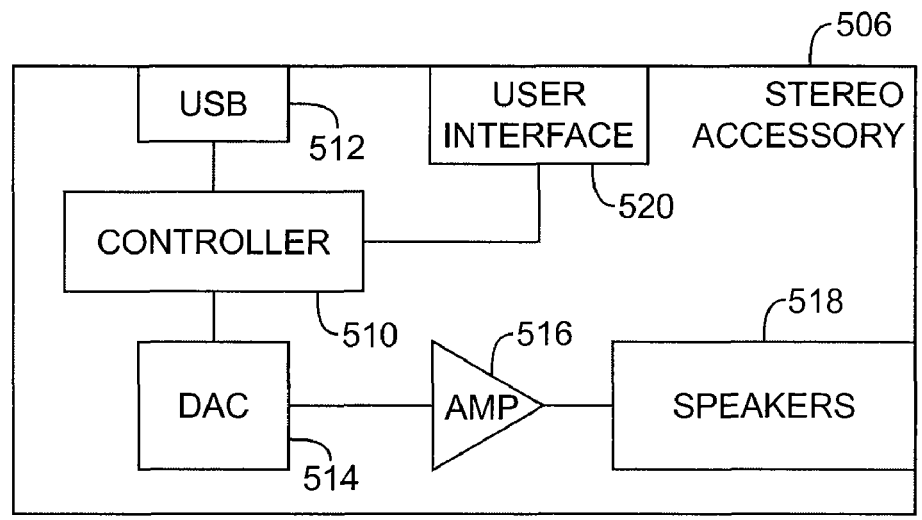
FIG. 6B shows a stereo accessory according to an embodiment of the present invention.

FIG. 6B is a functional block diagram illustrating stereo accessory 506 according to an embodiment of the present invention. Stereo accessory 506 can include controller 510, USB interface 512, digital-to-analog converter (DAC) 514, amplifier 516, speakers 518, and user interface 520. USB interface 512 can receive signals conforming to USB standards from external sources. The signals may include digital audio data conforming to USB protocols for digital audio transfer (e.g., the USB audio standard version 1.0 or a later version). The signals may also include commands and data corresponding to an accessory protocol via which stereo accessory 506 can communicate with media player 500 (FIG. 6A). Examples of accessory protocols and commands are described below. Other interfaces capable of receiving digital audio and/or other digital signals can be used in addition to or instead of USB interface 512.

Controller 510 (e.g., a microprocessor, microcontroller, application-specific integrated circuit, or the like) controls the operation of USB interface 512. For example, USB interface 512 may forward received packets (or data extracted therefrom) to controller 510, and controller 510 may process the packets, e.g., to determine whether they contain commands corresponding to the accessory protocol or digital audio data corresponding to the digital audio transfer protocol. Likewise, controller 510 may determine when information is to be sent to media player 500 (FIG. 6A) and may provide appropriate packets (or data to be included in packets) to USB interface 512 for transmission to media player 500. Controller 510 may be provided with memory (e.g., RAM and/or ROM, not explicitly shown) to store program code to be executed, or its functionality may be implemented using dedicated logic circuits.

DAC 514, which may be of generally conventional design, receives a stream of digital audio data and generates corresponding analog audio signals. These signals can be delivered, e.g., to stereo amplifier 516 and from amplifier 516 to stereo speakers 518, thereby enabling the user to hear an audio track. Any number of audio channels may be supported, including, e.g., 2-channel stereo, monaural (1-channel), and multi-channel stereo such as 5-channel, 5-channel plus subwoofer (so-called "5.1-channel"), 7.1-channel, etc.

User interface 520 may include input elements such as buttons, knobs, wheels, sliders, touch pads, or the like to allow a user to control various settings of stereo accessory 506, such as input source, volume, equalizer, balance among different speakers, etc. User interface 520 may also include output elements such as an LCD or other display screen, indicator lights, gauges, or the like, allowing stereo accessory 506 to provide status information to the user. In some embodiments, user interface 520 may be used to remotely control media player 500 when stereo accessory 506 is coupled thereto. For example, controller 510 can generate remote-control commands in an accessory protocol and send the commands to media player 500 via USB interface 512.

It will be appreciated that stereo accessory 506 as described herein is illustrative and that variations and modifications are possible. Stereo accessory 506 can be a component of a larger stereo system, and some blocks shown within stereo accessory 506 can be other components of a stereo system and can be housed in separate housings. For example, amplifier 516 and speakers 518 can be located in separate housings and connected to each other (and to stereo accessory 506) by cables. In addition, amplifier 516 can be replaced or supplemented with a digital amplifier, and DAC 514 can be coupled to receive amplified digital signals. Thus, any accessory capable of receiving digital audio from a media player such as media player 10 of FIG. 1 can be used in connection with the present invention.

As before mentioned, a connector interface system can be utilized with a command set to support the transfer of digital audio from a media player to an associated accessory. For example, in the USB environment, the transfer can be performed by streaming the digital audio to the accessory in accordance with a USB audio standard. It should be understood by one of ordinary skill in the art that although the above-identified connector interface system can be used with the command set, a variety of other connectors or systems can be used and they would be within the spirit and scope of the present invention.

The command set allows the media player to establish a configuration under which digital audio can be transferred to an accessory. For example, these commands can be used by the media player to gather a list of supported sample rates from the accessory and to inform the accessory of information related to streaming parameters being used by the media player for a particular track, such as sample rate, volume energy normalization value, and track volume adjustment value. In one embodiment in the USB environment, the media player selects a sample rate for a track based on the recorded sample rate of the track and a list of sample rates supported by the accessory. The media player notifies the accessory of the selected sample rate, and the accessory configures the USB interface for delivery of data at the sample rate selected by the media player. The media player may perform sample rate conversion internally to transfer digital audio at the selected sample rate.

Transactions for Digital Audio

In some embodiments, connecting the media player to the accessory to facilitate digital audio transfer over USB can be accomplished using the following steps:

1. User connects the media player to the accessory, for example, using a cable that connects between a connector on the media player and a USB port on the accessory. Alternatively, the accessory can be provided with a receptacle that directly connects to a connector on the media player.

2. The media player presents a plurality of possible USB configurations, or modes, to the accessory, for example, mass storage and HID/audio configurations. One of these configurations is presented to the accessory as a default USB configuration, and the accessory (depending on the capabilities of its USB driver) might or might not be able to change this default. To facilitate interaction with accessories whose USB drivers cannot change the default configuration, the media player can use the accessory-identifying resistor of FIG. 5C to determine which configuration should be presented to the accessory as the default. For example, referring to FIG. 5C, if the resistance across identify and detect pins indicates that the accessory is of a type that supports digital audio transfer, the media player can set its default configuration to the HID/audio configuration. For other types of accessories, the media player can set its default configuration to the mass storage mode. This technique allows the media player to work properly with accessories of various types whose drivers cannot (or are not configured to) change the media player's configuration from its default configuration.

3. If the accessory's driver supports changing the default configuration, the accessory can select the HID/audio configuration using a standard USB request.

In addition to configuring the USB connection, the media player and device can also establish coupling parameters using the accessory protocol. For example, when a connection between the accessory and the media player is established, the accessory may send an accessory-identification command that identifies the accessory to the media player as one supporting digital audio transfer. The media player may also authenticate the accessory (or vice versa) before digital audio transfer to the accessory is enabled. If authentication is successful, the media player and accessory can proceed immediately to establish digital audio transfer capabilities and parameters as described below. If authentication fails, digital audio output from the media player can be disabled immediately.

Figure 7:
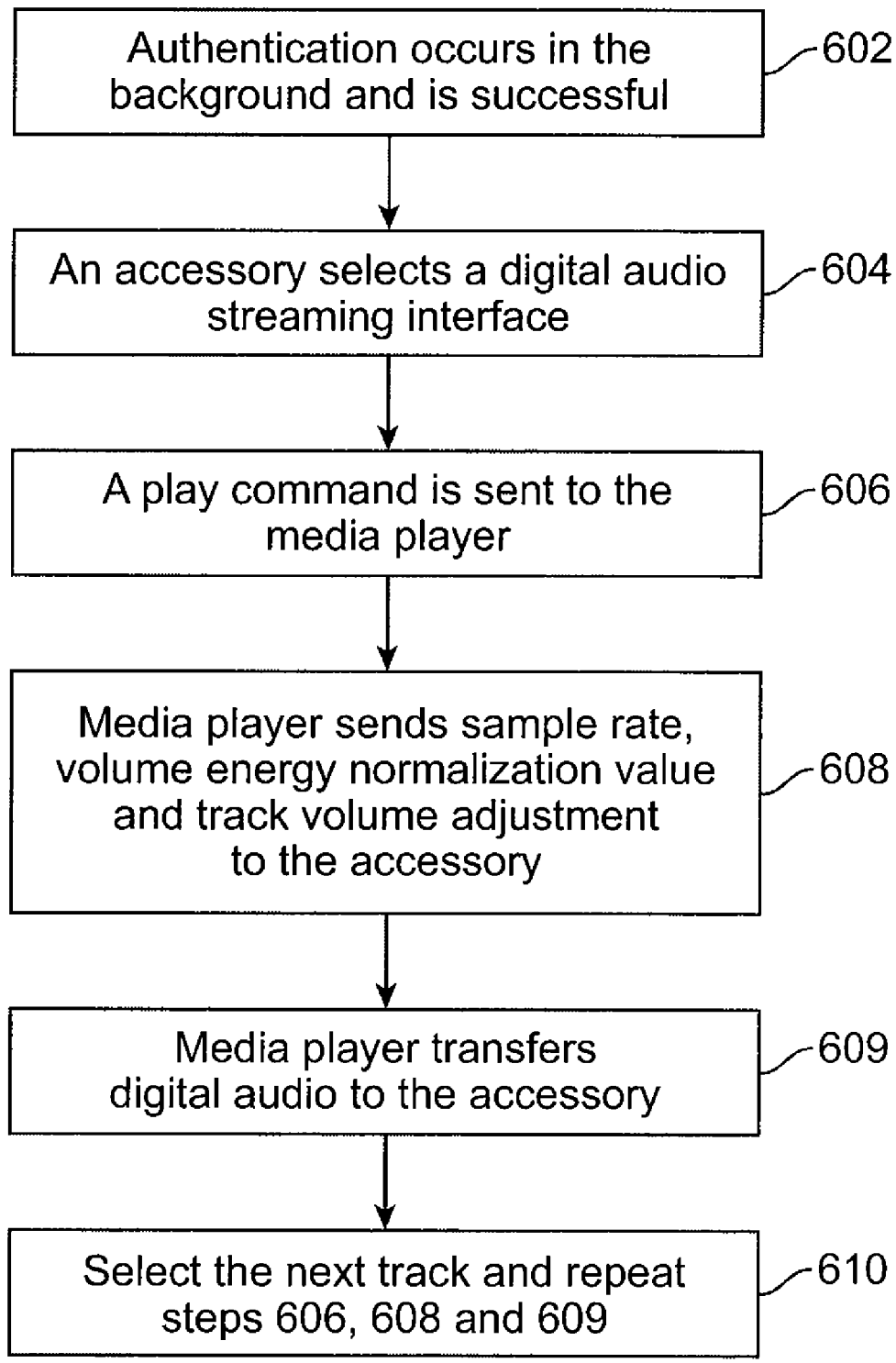
FIG. 7 is a flow chart illustrating a process for providing digital audio to an accessory according to an embodiment of the present invention.

FIG. 7 is a flow chart illustrating a process by which a media player can provide a digital audio signal to an accessory according to an embodiment of the present invention. First, authentication occurs (e.g., in the background) and is successful (step 602); as noted previously, if authentication is not successful, digital audio output from the media player can be disabled. The accessory selects a digital audio streaming interface (e.g., USB audio) for streaming the digital audio (step 604). A play command is sent to the media player (step 606). The media player sends playback parameters—such as a sample rate, a volume energy normalization value for the audio tracks, a track volume adjustment, or the like—to the accessory (step 608). The media player transfers digital audio to the accessory through the selected audio streaming interface (step 609). If a next track is selected (step 610), steps 606, 608 and 609 can be repeated.

In embodiments where the media player and the accessory use version 1.0 of the USB audio standard to transfer digital audio to the accessory, the accessory may act as "master" of the transfer transaction while the media player acts as "slave" to provide the requested audio data. In accordance with version 1.0 of the USB audio standard the sampling rate for the digital audio transfer is set by the master (i.e., the accessory). The accessory, however, might not have information about sampling rates for particular tracks stored on the media player. The media player has information about the sampling rate of each track but, as the slave, would not be permitted by version 1.0 of the USB audio standard to change the sampling rate for the USB digital audio transfer.

In accordance with an embodiment of the present invention, the accessory and the media player can use the accessory protocol to negotiate a sampling rate for a particular track. In some embodiments, the accessory protocol can be used to allow the media player to determine which sampling rates the accessory supports, to use this information to select a sampling rate for a track, and to inform the accessory of the selected sampling rate so that the accessory can correctly set the sampling rate for the USB transfer.

The media player can support a number of different sample rates. For example, in one embodiment, it can be specified that to be considered fully compatible with the media player, an accessory that receives digital audio output should support a "basic set" of sample rates (e.g., three or four different rates); the accessory and the media player may also support any number of other sample rates in addition to the basic set. FIG. 8 illustrates sample rates supported by a media player (in both decimal and hexadecimal notation) according to an embodiment of the present invention. In this embodiment, the media player supports a basic set of three sample rates (32 kHz, 44.1 kHz, and 48 kHz); these sample rates are marked with asterisks in FIG. 8. In addition, the media player supports additional sample rates that correspond to ½ or ¼ of one of the sample rates in the basic set.

An audio track can be stored on the media player with any of the sample rates supported by the media player (e.g., the rates listed in FIG. 8). A fully compatible accessory supports at least the sample rates in the basic set (e.g., 32 kHz, 44.1 kHz and 48 kHz) but might not support other rates at which a track can be stored by the media player. Accordingly, the media player can be configured to resample the track in real time as the audio is being streamed to the accessory in order to provide the track at an accessory-supported sampling rate. For example, any one of the first six sample rates in FIG. 8 can be converted to one or another of the three sample rates in the basic set by multiplying up by a factor of 2 or 4. In one embodiment, processor 124 of FIG. 1 can perform the resampling as needed during streaming of the audio data to the accessory.

Figure 9:
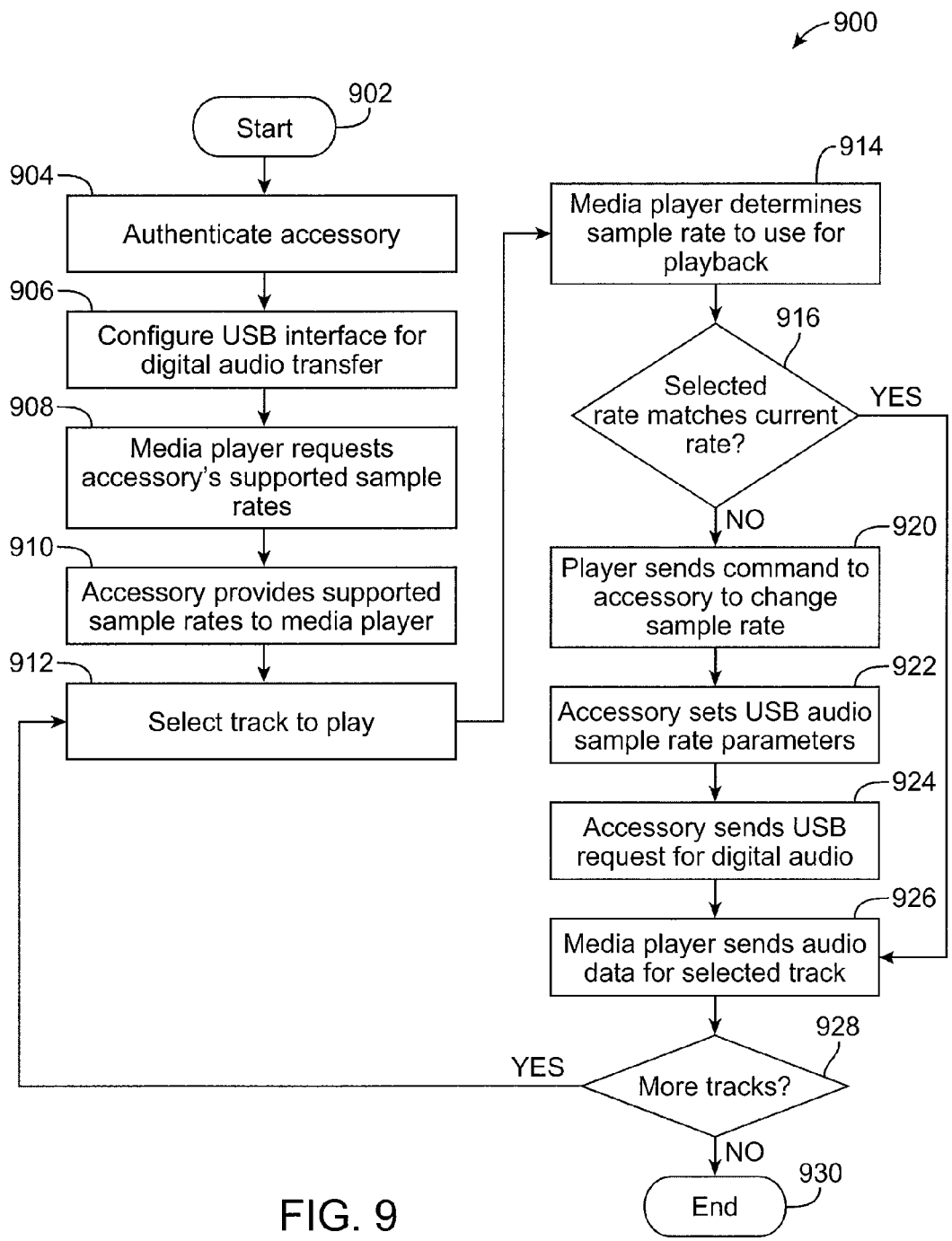
FIG. 9 is a flow chart illustrating another process for controlling an accessory according to an embodiment of the present invention.

FIG. 9 is a flow chart illustrating process 900 that can be used for transferring digital audio data from a media player to an accessory according to an embodiment of the present invention. Process 900 starts (step 902) when a media player (e.g., media player 10 of FIG. 1 or media player 500 of FIG. 6) is connected to an accessory (e.g., stereo accessory 506 of FIG. 6) that has been identified as an accessory capable of receiving a digital audio stream. As described above, the accessory may be so identified, for example, by exchanging commands using the accessory protocol, or by using a device-identifying signal such as can be generated as described above with reference to FIG. 5C. The media player authenticates the accessory (step 904); authentication can include exchanging authentication commands using the accessory protocol. If authentication is not successful, process 900 can exit (not explicitly shown).

At step 906, a USB interface can be configured for digital audio transfer. Although USB is used herein as an example, other interfaces can also be used. Configuring the interface can be controlled by the accessory and may include, e.g., selecting an HID/audio configuration in preference to a mass-storage configuration. Alternatively, as described above, the media player may present the HID/audio configuration to the accessory as the default USB configuration.

At step 908, the media player requests a list of sample rates supported by the accessory. The request can be made by using the accessory protocol to transmit a command from the media player to the accessory. At step 910, the accessory returns the list of the sample rates it supports; the list can be returned by using the accessory protocol to transmit a responsive command from the accessory to the media player. In one embodiment, the list of sample can be limited to including only sample rates that are supported by the media player. For instance, if the media player supports the sample rates listed in FIG. 8 and the accessory supports the sample rates of 32 kHz, 40 kHz, 44.1 kHz, and 48 kHz, the 40 kHz rate might not be included in the list.

At step 912, a track to be played is selected. For example, a user might select a track using user input device 108 and display 110 of media player 10 (FIG. 1). Alternatively, an accessory that provides remote control of the media player can be used to select a track; such an accessory might be the same accessory that is to receive the digital audio or a different accessory. In some instances, a track might also be selected automatically, e.g., when progressing through a predefined list of tracks to be played ("playlist").

At step 914, the media player determines the sample rate to be used for playback (streaming) of the selected track. In one embodiment, the sampling rate can be determined based on the sample rate of the stored track and the list of sample rates supported by the accessory. For example, if the accessory supports the sample rate of the stored track, that sample rate can be selected. If the accessory does not support the sample rate of the stored track, the media player can select a sample rate that is supported by the accessory and to which the media player is capable of converting the track during streaming. For instance, if the accessory supports only the basic set of sample rates shown in FIG. 8 and the track is stored at, e.g., 24 kHz, the media player can select a sample rate of 48 kHz and up-sample the track by a factor of two (e.g., by interpolating between adjacent samples as is known in the art).

In some embodiments, processor 124 of media player 10 (FIG. 1) implements the sample rate conversion. Processor 124 can be programmed to convert any sample rate to any other sample rate as desired; accordingly, the present invention is not limited to any particular combination of supported sample rates or to particular sample rate conversion techniques.

Once the sample rate to be used has been selected, the media player determines whether the selected sample rate matches the current sample rate (step 916). In some embodiments, for the first track, the selected sample rate can be presumed not to match the current rate; for subsequent tracks, a current rate established in a previous iteration of step 914 can be compared to the newly determined rate. If the selected sample rate and the current sample rate are the same, the media player can proceed to send the audio data (step 926) without requesting adjustments in the sample rate.

If the selected sample rate and the current sample rate are different at step 916, the media player sends an accessory-protocol command to the accessory, indicating the selected sample rate (step 920). In some embodiments, the accessory can return an acknowledgement to the media player using an accessory-protocol command to confirm that the sample rate will be changed.

The accessory uses the sample rate identified by the media player to set a USB sample rate parameter (step 922). The accessory then sends a USB request to the media player to begin streaming the digital audio (step 924). The media player streams the digital audio at the USB sample rate set by the accessory (step 926).

A decision is made (step 928) as to whether more tracks remain to be played. This decision can be based on user input and/or programmed decision rules for determining whether to proceed automatically to the next track of an album or other playlist. If another track is to be played, process 900 returns to step 912 to select the next track, and a sample rate to be used for the new track is determined. If (step 928) no more tracks are to be played, process 900 ends (step 930).

Thus, the media player can determine the sample rate for each track, but the accessory sets the sampling rate for the USB transfer in accordance with version 1.0 of the USB audio standard. (The same technique or similar techniques can also be used with other audio standards.) As noted above, the media player can determine the sample rate for a track based o the stored sample rate of the track and the list of sample rates supported by the accessory. If the stored sample rate is supported by the accessory, then the stored sample rate selected for playback. In the example where the possible stored sample rates are those listed in FIG. 8, if the stored sample rate for a track is not supported by the accessory, then the media player can select a playback sample rate for that track that is a multiple of the stored sample rate and that is supported by the accessory. Thus, for instance, if the accessory supports only the three basic sample rates listed in FIG. 8 (32 kHz, 44.1 kHz, 48 kHz), a track with a stored sample rate of 11.025 kHz can be played back at 44.1 kHz while a track with a sample rate of 12 kHz can be played back at 48 kHz.

It will be appreciated that process 900 is illustrative and that variations and modifications are possible. Steps described as sequential may be executed in parallel, order of steps may be varied, and steps may be modified or combined. For example, in some embodiments using USB audio transfer, the media player can always select one of the sample rates in the basic set, in which case obtaining a list of supported sample rates from the accessory can be omitted. In addition, a similar process can be used in regard to other parameters for audio playback, such as parameters related to normalization of volume energy, track volume, or any other parameters that can be selected by the media player but set by the accessory.

Process 900 can continue until such time as digital audio transfer from the media player to the accessory is disabled. In one embodiment, digital audio is disabled when the USB connection between the media player and the accessory is lost (e.g., when a cable connecting the two is disconnected). The accessory can also disable digital audio by selecting a zero bandwidth USB audio streaming rate and/or by deselecting the HID/audio configuration. If digital audio becomes disabled, it can be re-enabled using procedures described above.

In some embodiments, if the accessory requests digital audio data before digital audio is enabled to or before the correct digital sample rate has been negotiated, the media player can return packets (e.g., USB audio packets) filled with zeros. The media player can also return packets filled with zeros if authentication fails.

Thus, embodiments of the present invention relate to commands that can be exchanged between a media player and an accessory for purposes of allowing the accessory can play digital audio media streamed from the media player. In one embodiment, the commands can include:

1. A command sent by the media player to the accessory request a list of sample rates supported by the accessory.
2. A command sent by the accessory to the media player and including the list of sample rates supported by the accessory.
3. A command sent by the media player to the accessory to provide the sample rate (and/or other information) for a track to be played.
4. A command sent by the accessory to the media player to acknowledge receipt of the sample rate information.

Other commands may also be supported.

Although the present invention has been described in accordance with the embodiments shown, one of ordinary skill in the art will readily recognize that there can be variations to the embodiments and those variations would be within the spirit and scope of the present invention. For example, the present invention can be implemented using hardware, software, a computer readable medium containing program instructions, or a combination thereof. Software written according to the present invention can be either stored in some form of computer-readable medium such as memory or CD-ROM, or can be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for transmitting digital audio data to an accessory by a media player, the method comprising:
   - identifying a stored sample rate for a first track of digital audio data to be played, wherein the first track is stored on the media player;
   - selecting a first playback sample rate for the first track, wherein the first playback sample rate is based on a list of sample rates supported by the accessory and the stored sample rate for the first track;
   - transmitting to the accessory, using an accessory protocol, information indicating the first playback sample rate; and
   - delivering the digital audio data of the first track to the accessory at the first playback sample rate.

2. The method of claim 1 further comprising:
   - obtaining from the accessory, using the accessory protocol, the list of sample rates for digital audio supported by the accessory.

3. The method of claim 1 wherein delivering the digital audio data includes delivering the digital audio data using a digital audio transfer protocol.

4. The method of claim 3 wherein the digital audio transfer protocol corresponds to a Universal Serial Bus (USB) audio protocol.

5. The method of claim 4 further comprising:
   - prior to delivering the digital data of the first track, receiving from the accessory, using the USB audio protocol, an instruction to set a sample rate of a digital audio output interface to the first playback sample rate.

6. The method of claim 1 wherein in the event that the stored sample rate for the first track and the first playback sample rate are different, delivering the digital audio data further includes:
converting, within the media player, the digital audio data from the stored sample rate for the first track to the first playback sample rate.

7. The method of claim 1 further comprising:
identifying a stored sample rate associated with a second track of digital audio data to be played, wherein the second track is stored on the media player; and
selecting a second playback sample rate for the second track, wherein the second playback sample rate is based on the list of sample rates supported by the accessory and the stored sample rate for the second track.

8. The method of claim 7 further comprising:
in the event that the second playback sample rate is different from the first playback sample rate, transmitting to the accessory, using the accessory protocol, information indicating the second playback sample rate; and
delivering the digital audio data of the second track to the accessory at the second playback sample rate.

9. The method of claim 7 wherein in the event that the stored sample rate for the second track and the second playback sample rate are different, delivering the digital audio data further includes:
converting, within the media player, the digital audio data from the stored sample rate for the second track to the second playback sample rate.

10. The method of claim 1 wherein obtaining the list of sample rates supported by the accessory includes:
transmitting to the accessory, using the accessory protocol, a command requesting the list of sample rates supported by the accessory; and
receiving from the accessory, using the accessory protocol, a responsive command that includes the list of sample rates supported by the accessory.

11. A method for obtaining digital audio from a media player by an accessory, the method comprising:
receiving from the media player, using an accessory protocol, an identification of a first playback sample rate associated with a first track of digital audio data to be played, the first track being a track stored on the media player, wherein the first playback sample rate is selected by the media player and is a sample rate supported by the accessory;
configuring a digital audio transfer protocol between the accessory and the media player to receive data at the first playback sample rate; and
receiving from the media player, using the digital audio transfer protocol, the digital audio data of the first track at the first playback sample rate.

12. The method of claim 11 further comprising:
providing to the media player, using the accessory protocol, a list of sample rates supported by the accessory.

13. The method of claim 11 wherein the digital audio protocol corresponds to a Universal Serial Bus (USB) audio protocol, the method further comprising:
configuring a USB connection between the media player and the accessory to operate in a USB audio mode.

14. The method of claim 13 wherein the USB audio mode is a combined USB human interface device (HID) and audio mode.

15. The method of claim 13 wherein configuring the USB connection to operate in the USB audio mode includes:
sending to the media player an accessory identifying signal identifying the accessory as being capable of receiving digital audio from the media player,
wherein in response to the accessory identifying signal, the media player presents the USB audio mode to the accessory as a default USB configuration.

16. The method of claim 15 wherein sending the accessory identifying signal includes applying an accessory identifying resistance across two pins of a connector coupling the media player and the accessory.

17. The method of claim 15 wherein sending the signal includes transmitting to the media player, using the accessory protocol, a device identifying command that includes data identifying the accessory as being capable of receiving digital audio from the media player.

18. The method of claim 13 wherein configuring the digital audio transfer protocol includes sending to the media player an instruction to set a sample rate of a digital audio output interface of the media player to the first playback sample rate.

19. The method of claim 11 wherein the first playback sample rate is different from a stored sample rate associated with the first track as stored in the media player.

20. The method of claim 11 further comprising:
receiving, from the media player using the accessory protocol, an identification of a second playback sample rate associated with a second track of digital audio data to be played, the second track being a track stored on the media player, wherein the second playback sample rate is selected by the media player and is one of the sample rates included in the list of sample rates supported by the accessory.

21. The method of claim 20 further comprising:
in the event that the second playback sample rate is different from the first playback sample rate, reconfiguring the digital audio transfer protocol to receive data at the second playback sample rate; and
receiving, from the media player using the digital audio transfer protocol, the digital audio data of the second track at the second playback sample rate.

22. The method of claim 11 further comprising:
receiving from the media player, using the accessory protocol, a command requesting a list of sample rates supported by the accessory,
wherein the act of providing the list of sample rates supported by the accessory is performed in response to the received command requesting the list of sample rates supported by the accessory.

23. A media player comprising:
an interface configured to communicate with an accessory, the interface being configured to support a digital audio transfer protocol for transferring digital audio to the accessory and further configured to support an accessory protocol for exchanging with the accessory commands and information related to the delivery of digital audio data;
a storage device configured to store media assets including a plurality of tracks of digital audio data, each track having a stored sample rate associated therewith; and
a processor coupled to the storage device and the interface, wherein the processor is configured to:
select a first sample rate for a first stored track of digital audio data based on the stored sample rate associated with the first stored track and a list of sample rates supported by the accessory;
communicate to the accessory, using the accessory protocol, the selected sample rate; and deliver to the accessory, using the digital audio transfer protocol, the digital audio data of the first stored track at the first selected sample rate.

24. The media player of claim 23 wherein the processor is further configured to obtain from the accessory, using the accessory protocol, a list of sample rates supported by the accessory.

25. The media player of claim 23 wherein the interface includes a Universal Serial Bus (USB) interface.

26. The media player of claim 25 wherein the digital audio transfer protocol corresponds to a USB audio protocol.

27. The media player of claim 23 wherein the processor is further configured such that, in the event that the first selected sample rate and the first stored sample rate are different, the processor converts the digital audio data of the first track from the first stored sample rate to the first selected sample rate.

28. The media player of claim 23 wherein the processor is further configured to select a second sample rate for a second stored track of digital audio data based on the stored sample rate associated with the second stored track and the list of sample rates supported by the accessory; to communicate to the accessory, using the accessory protocol, the selected sample rate; and to deliver to the accessory, using the digital data transfer protocol, the digital audio data of the second stored track at the second selected sample rate.

29. An accessory for use with a media player, the accessory comprising:
   an interface configured to communicate with the media player, the interface being configured to support a digital audio transfer protocol for receiving digital audio from the media player and further configured to support an accessory protocol for exchanging with the media player commands and information related to the delivery of digital audio data; and
   a controller coupled to the interface and to an audio output section,
   wherein the controller is configured to:
      receive from the media player, using the accessory protocol, information identifying a first playback sample rate associated with a first track of digital audio data to be played, the first track being a track stored on the media player, wherein the first playback sample rate is selected by the media player and is a sample rate supported by the accessory;
      operate the interface, using the digital audio transfer protocol, to receive data at the first playback sample rate; and
      deliver the digital audio data to the audio output section.

30. The accessory of claim 29 wherein the controller is further configured to provide to the media player, using the accessory protocol, a list of sample rates supported by the accessory.

31. The accessory of claim 29 wherein the digital audio transfer protocol corresponds to a Universal Serial Bus (USB) audio protocol.

32. The accessory of claim 29 wherein the controller is further configured to:
   receive, from the media player using the accessory protocol, an identification of a second playback sample rate associated with a second track of digital audio data to be played, the second track being a track stored on the media player, wherein the second playback sample rate is selected by the media player and is one of the sample rates included in the list of sample rates supported by the accessory; and
   in the event that the second playback sample rate is different from the first playback sample rate, reconfigure the digital audio transfer interface to receive data at the second playback sample rate.

33. The accessory of claim 29 wherein the interface includes:
   a connector having a plurality of pins configured to mate with a corresponding plurality of pins of a connector of the media player, and
   an accessory identifying resistance connected between two of the plurality of pins of the connector.

34. The accessory of claim 29 wherein the audio output section includes:
   a digital to analog converter configured to convert a stream of digital audio data to an analog audio signal.

35. The accessory of claim 34 wherein the audio output section further includes:
   a speaker coupled to receive the analog audio signal and configured to produce sounds in response to the analog audio signal.

* * * * *

UNITED STATES PATENT AND TRADEMARK OFFICE
CERTIFICATE OF CORRECTION

| | | |
|---|---|---|
| PATENT NO. | : 7,826,318 B2 | Page 1 of 1 |
| APPLICATION NO. | : 11/768897 | |
| DATED | : November 2, 2010 | |
| INVENTOR(S) | : Paul Holden et al. | |

It is certified that error appears in the above-identified patent and that said Letters Patent is hereby corrected as shown below:

On page 4, in column 2, under "Other Publications", line 7, delete "Colloquim" and insert -- Colloquium --, therefor.

On page 4, in column 2, under "Other Publications", line 16, delete "Press/auqust!8.2" and insert -- Press/august!8.2 --, therefor.

On page 5, in column 1, under "Other Publications", line 3, delete "Authoritive" and insert -- Authoritative --, therefor.

In column 6, line 45, delete "it entirety" and insert -- its entirety --, therefor.

Signed and Sealed this
Fifteenth Day of November, 2011

David J. Kappos
*Director of the United States Patent and Trademark Office*